March 27, 1945.    J. E. LOVELY    2,372,592
FLUID ACTUATED DOUBLE ENDED CHUCK SPINDLE
Filed March 27, 1944
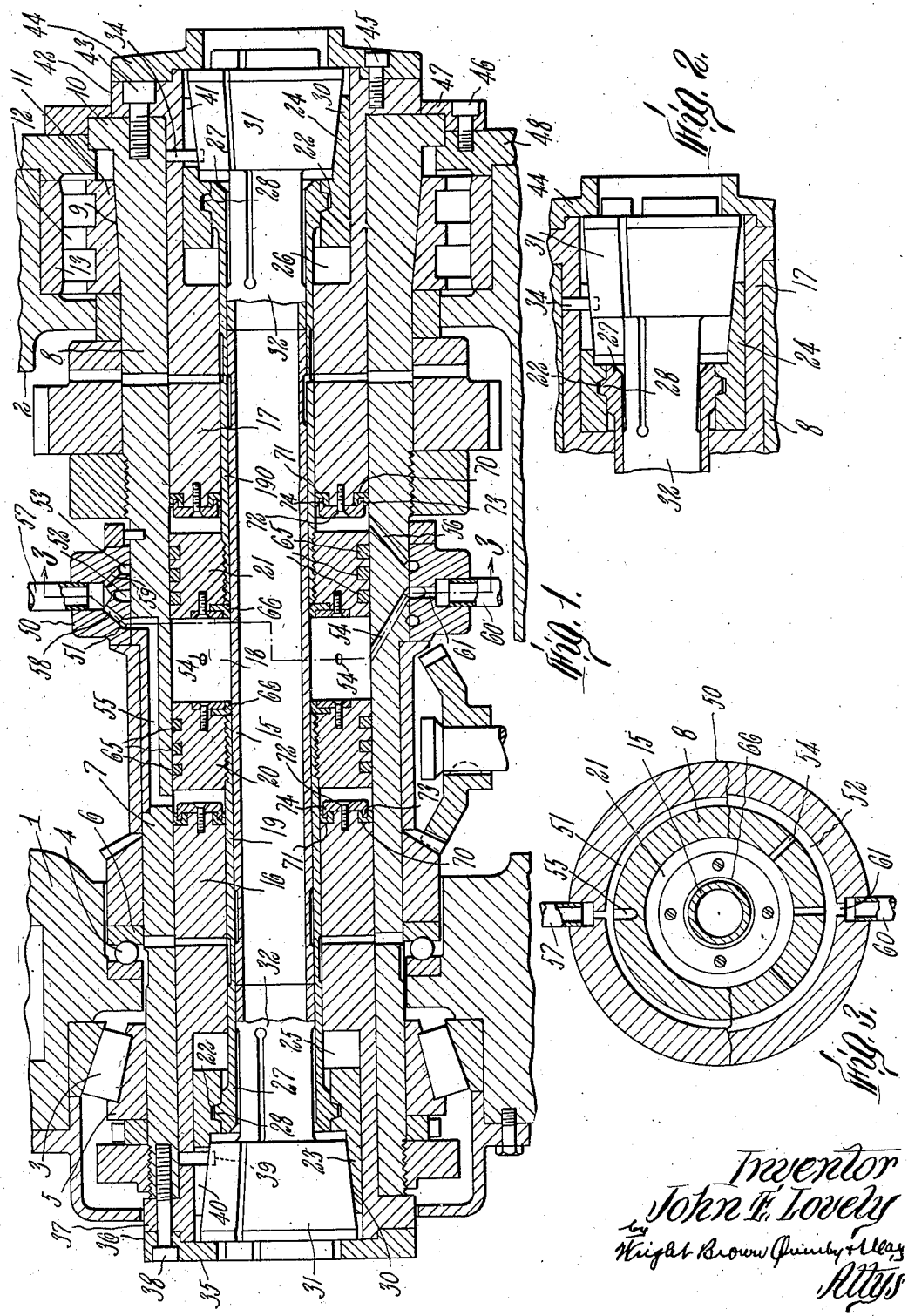
Inventor
John E. Lovely Patented Mar. 27, 1945

2,372,592

UNITED STATES PATENT OFFICE 2,372,592

FLUID ACTUATED DOUBLE ENDED CHUCK SPINDLE

John E. Lovely, Springfield, Vt., assignor to Jones & Lamson Machine Company, Springfield, Vt., a corporation of Vermont Application March 27, 1944, Serial No. 528,333

4 Claims. (Cl. 279—4)

This invention relates to rotary work spindles, each having a pair of work-engaging fluid actuated chucks spaced axially therealong.

One object of the invention is to provide simple fluid actuated means for opening and closing both chucks.

A further object is to provide for equal opening and closing pressure on both chucks.

Other objects and advantages will appear from a more complete description of an embodiment of the invention shown in the accompanying drawing, in which Figure 1 is a central longitudinal sectional view through a work-holding spindle and its immediate mounting, the spindle being provided with a pair of axially spaced chucks and embodying the invention, the chucks being shown in a nearly fully closed condition.

Figure 2 is a sectional detail similar to a portion of Figure 1, but showing one of the chucks in open position.

Figure 3 is a detail sectional view on line 3—3 of Figure 1.

Referring to the drawing, at 1 and 2 are shown spaced wall members apertured for the journaled reception of a work-holding spindle. Between the journal opening of the wall 1 and the spindle are a pair of antifriction bearings 3 and 4, the bearing 3 being shown as a conical roller bearing and the bearing 4 as an axial thrust ball bearing. The movable raceways 5 and 6 of both these bearings are shown as secured to an outer tube 7 forming the outer wall of the spindle. The portion of this tube which has a bearing in the aperture in the frame member 2 is shown as of somewhat larger external diameter as at 8, and this is provided with a tapered portion 9 terminating in an outwardly extending end flange 10. The tapered portion 9 carries thereon the reversely tapered inner raceway 11 of a double roller bearing 12, the outer raceway 13 of which is seated within the bearing opening of the member 2. Coaxially arranged within the outer tube 7 there is positioned an inner tube 15 through the central bore of which the work (not shown) extends. These outer and inner tubes are spaced apart partly by annular sleeves 16 and 17, forming between them an annular chamber 18. Between the tube 15 and the spacing sleeves 16 and 17 there are slidably mounted sleeves 19 and 190. To the adjacent ends of these sleeves there are secured annular pistons 20 and 21 which are slidable within the chamber 18 and as they slide they move the sleeves 19 and 190 therewith. The outer ends of these sleeves 19 and 190 are each provided with enlarged diameter portions 27, provided with outwardly extending tapered annular flanges 28 which engage in internal grooves 22 in a pair of collet sleeves 23 and 24. These collet sleeves 23 and 24 ride in annular chambers 25 and 26 formed by enlarged diameter inner wall portions of the spacing sleeves 16 and 17. Each of these sleeves is provided with an axially tapered inner face 30 cooperating with the reversely tapered spring jaws 31 of a collet 32. The inner ends of these collets bear against the ends of the central tube 15. The left hand collet 32 is held in position against the left hand end of the tube 15 as by an annular head member 35 having an annular portion 36 engaging an outwardly extending annular flange 37 near to the outer end of the spacer sleeve 16, the head 35 being secured in position as by screws 38. The collet sleeve 23 is held from rotation relative to the spindle as by means of a key pin 39, secured to the spacer sleeve 16 and projecting through a suitable slot 40 in the collet sleeve 23 and also projecting into a slot in the left hand collet 32, which also insures against relative rotation between this collet 32 and the spacer sleeve 16, and as this sleeve is also secured by the screw 38 to the outer tube 7, all these parts are held against relative rotation.

The right hand collet is similarly held against rotation by a radial key pin 34 projecting from the spacer sleeve 17 through a slot 41 through the right hand collet sleeve 24 and into an opening in the right hand collet. The spacer sleeve 17 is provided with an end flange 42 which is secured to the outer tube 7 as by screws 43, and an end cap 44 which holds the right hand collet back against the end of the tube 15 is secured in position to the flange 42 as by screws 45. The outer tube 7 is held to the left within its tapered bearing raceway 11 as by screws 46 which pass through an annular retaining plate 47 engaging outwardly of the flange 10 and into a fixed frame element 48.

It will be noted that if the piston 20 is moved from the position shown in Figure 1, toward the piston 21, the actuating sleeve 19 is carried therewith, which pulls the collet sleeve 23 to the right and opens the collet jaws away from the central axis of the spindle, while motion of the piston 21 toward the piston 20, acting through the actuating sleeve 190 and the collet sleeve 24, opens the right hand collet. Thus motion of the pistons 20 and 21 toward each other acts to open the two collets, while motion of these pistons away from each other acts to close both collets. Means are therefore provided, according to this invention, for selectively introducing fluid under pressure into the chamber 18 between the pistons 20 and 21, or outwardly of these pistons between them and the spacer sleeves 16 and 17, thus to subject both collets simultaneously to equal closing or opening pressures.

As the spindle is mounted for rotation, however, means must be provided by which fluid under pressure may be introduced into the chamber 18 and discharged therefrom at opposite sides of the pistons, from outside the spindle. To this end the spindle is shown as journaled within an annular stationary member 50 having on its inner face three axially spaced grooves 51, 52 and 53. The intermediate groove 52 communicates with the interior of the chamber 18 between the pistons 20 and 21 as through a passage 54. The groove 51 communicates through a passage 55 within the outer tube 7 to the chamber 18 between the piston 20 and the spacer sleeve 16, while the groove 53 communicates through a passage 56 through the outer tube 7 into the chamber 18 between the piston 21 and the spacer sleeve 17. A stationary pipe 57 enters the annular bearing member 50 and communicates with the annular grooves 51 and 53 through the passages 58 and 59, while a second stationary pipe 60 which also enters the bearing member 50 communicates through a passage 61 with the central groove 52. Thus by selectively introducing fluid under pressure into either of the pipes 57 or 60, while discharging from the other pipe, the pistons may be moved either toward or from each other, thus to tighten or release the collets with respect to work positioned within the inner tube 15. As shown these pistons are provided with suitable piston rings 65 bearing against the inner face of the outer tube 7 and with packing rings 66 at their inner ends bearing against the outer face of the inner tube 15. Similarly, annular packing rings 70 and 71 may be positioned between the outer tube 7 and the spacer sleeves 16 and 17 and between these spacer sleeves the outer walls of the actuating sleeves 19 and 190. These latter packing rings may be secured by clamping rings 72 having flanges 73 and 74 bearing against the packing rings 70 and 71.

From the foregoing description of an embodiment of this invention, it should be evident to those skilled in the art that various changes and modifications might be made without departing from the spirit or scope of this invention.

I claim:

1. In combination a rotary work-holding spindle including a work-receiving tube, a pair of means spaced along said tube for gripping work positioned within said tube, an annular pressure chamber surrounding said tube, a pair of annular pistons reciprocable within said chamber, operative connections between said pistons and said work-gripping means causing the reciprocation of said pistons to actuate said gripping means to grip or release the work, and means for selectively introducing fluid under pressure into said chamber between said pistons or outwardly of said pistons and for discharging fluid from said chamber outwardly of said pistons or from between said pistons, respectively.

2. In combination, a rotary work-holding spindle including a work-receiving tube, a pair of means spaced along said tube for gripping work positioned within said tube, an annular pressure chamber surrounding said tube, a pair of annular pistons reciprocable within said chamber, operative connections between said pistons and said work-gripping means causing the reciprocation of said pistons to actuate said gripping means to grip or release the work, an annular member within which said spindle is journaled and provided with three axially spaced annular internal grooves, said spindle having a passage leading from the intermediate of said grooves to said chamber between said pistons and passages leading from the end grooves to said chamber beyond said pistons, and means for selectively admitting fluid under pressure to said intermediate or end grooves while discharging fluid from said end or intermediate grooves, respectively.

3. In combination, a rotary work-holding spindle comprising a pair of concentric spaced tubes, means securing said tubes together for simultaneous rotation, journal means for the outer of said tubes, a pair of axially spaced annular pistons in the space between said tubes slidably axially of said tubes, actuating sleeves to adjacent ends of which said pistons are secured, means closing off the annular space between said tubes outwardly of said pistons, work-engaging chucks at opposite ends of said spindles having opening and closing means connected to and actuated by axial motion of said sleeves, and means for selectively introducing and discharging fluid between said pistons or between each of said pistons and said closing means.

4. In combination, a rotary work-holding spindle comprising a pair of concentric spaced tubes, means securing said tubes together for simultaneous rotation, journal means for the outer of said tubes, a pair of axially spaced annular pistons in the space between said tubes slidable axially of said tubes, actuating sleeves to adjacent ends of which said pistons are secured, means closing off the annular space between said tubes outwardly of said pistons, oppositely faced collets at opposite ends of said tubes, axially movable collet sleeves outwardlly of said collets, interengaging parts on said collet sleeves and actuating sleeves causing motion of said actuating sleeves to move said collet sleeves to open or close said collets, and means for selectively introducing and discharging fluid between said pistons or between each of said pistons and said closing means.

JOHN E. LOVELY.